(12) United States Patent
Evreinov et al.

(10) Patent No.: US 10,133,370 B2
(45) Date of Patent: Nov. 20, 2018

(54) HAPTIC STYLUS

(71) Applicants: TAMPEREEN YLIOPISTO, Tampereen, Yliopisto (FI); FUKOKU CO., LTD., Ageo-shi, Saitama (JP)

(72) Inventors: Grigori Evreinov, Tampere (FI); Ahmed Farooq, Tampere (FI); Roope Raisamo, Tampere (FI); Arto Hippula, Tampere (FI); Daisuke Takahata, Saitama (JP); Kazuyuki Ikehama, Saitama (JP); Tetsuya Arasawa, Saitama (JP)

(73) Assignees: Tampereen Yliopisto, Tampereen, Yliopisto (FI); FUKOKU CO., LTD., Saitama (JP)

( * ) Notice: Subject to any disclaimer, the term of this patent is extended or adjusted under 35 U.S.C. 154(b) by 261 days.

(21) Appl. No.: 15/053,312

(22) Filed: Feb. 25, 2016

(65) Prior Publication Data

US 2016/0282970 A1    Sep. 29, 2016

(30) Foreign Application Priority Data

Mar. 27, 2015 (JP) .................. 2015-066079

(51) Int. Cl.
  *G06F 3/0354* (2013.01)
  *G06F 3/01* (2006.01)
  (Continued)

(52) U.S. Cl.
  CPC .......... *G06F 3/03545* (2013.01); *G06F 3/016* (2013.01); *G06F 3/0383* (2013.01); *G06F 3/041* (2013.01)

(58) Field of Classification Search
  CPC .... G06F 3/016; G06F 3/03545; G06F 3/0383; G06F 3/041
  See application file for complete search history.

(56) References Cited

U.S. PATENT DOCUMENTS 3,957,162 A    5/1976  Soderqvist
5,642,469 A    6/1997  Hannaford et al.
(Continued)

FOREIGN PATENT DOCUMENTS

WO    WO2004/095170    11/2004
WO    WO2011/061395    5/2011
WO    WO2013/003128    1/2013

OTHER PUBLICATIONS

Wintergerst et al., "Reflective Haptics: Enhancing Stylus-Based Interactions on Touch Screens", EuroHaptics Conference Proceedings, 2010, Part I, LNCS 6191, pp. 360-366.
(Continued)

*Primary Examiner* — Dmitriy Bolotin
(74) *Attorney, Agent, or Firm* — Andrew M. Calderon; Roberts Mlotkowski Safran Cole & Calderon, P.C.

(57) ABSTRACT

One embodiment relates to a haptic stylus includes: a stylus housing; a stylus tip attached to one end of the stylus housing, so as to be in contact with an interaction surface, such as a touchscreen; a stylus covering attached to a circumference of the stylus housing, so as to be movable with respect to the stylus housing along a longitudinal direction of the haptic stylus and so as to be gripped/held by user's fingers; and a first actuator configured to activate the stylus housing to thereby cause a stick-slip phenomenon between the stylus covering and the user's fingers gripping/holding the stylus covering thereby allowing the user's fingers to grip/hold the stylus covering while moving along the longitudinal direction of the haptic stylus.

29 Claims, 10 Drawing Sheets

(51) Int. Cl.
*G06F 3/038* (2013.01)
*G06F 3/041* (2006.01)

(56) References Cited

U.S. PATENT DOCUMENTS

| | | | |
|---|---|---|---|
| 6,724,128 | B2 | 4/2004 | Cheng et al. |
| 6,841,899 | B2 | 1/2005 | Kaneko |
| 7,265,750 | B2* | 9/2007 | Rosenberg .............. A63F 13/06 178/18.04 |
| 8,230,990 | B2 | 7/2012 | Lynch et al. |
| 8,432,361 | B2 | 4/2013 | Wu et al. |
| 8,525,778 | B2 | 9/2013 | Colgate et al. |
| 8,681,130 | B2 | 3/2014 | Adhikari |
| 8,725,292 | B2 | 5/2014 | Perlin et al. |
| 8,749,533 | B2 | 6/2014 | Adhikari |
| 8,773,403 | B2 | 7/2014 | Adhikari |
| 2002/0084114 | A1 | 7/2002 | Xu et al. |
| 2002/0097223 | A1* | 7/2002 | Rosenberg .............. A63F 13/06 345/157 |
| 2005/0065649 | A1 | 3/2005 | Rosenfeld et al. |
| 2005/0125228 | A1 | 6/2005 | Samuels |
| 2005/0248549 | A1* | 11/2005 | Dietz ...................... G06F 3/016 345/179 |
| 2008/0225007 | A1 | 9/2008 | Nakadaira et al. |
| 2009/0079703 | A1 | 3/2009 | Kyung et al. |
| 2010/0042258 | A1 | 2/2010 | Perlin et al. |
| 2012/0127088 | A1 | 5/2012 | Pence et al. |
| 2012/0139879 | A1 | 6/2012 | Kim et al. |
| 2012/0206419 | A1 | 8/2012 | Lee et al. |
| 2012/0293463 | A1 | 11/2012 | Adhikari |
| 2012/0293464 | A1* | 11/2012 | Adhikari ............... G06F 3/0354 345/179 |
| 2012/0295709 | A1* | 11/2012 | Adhikari ............. G06F 3/03545 463/37 |
| 2013/0002614 | A1 | 1/2013 | Nowatzyk et al. |
| 2014/0035884 | A1 | 2/2014 | Oh et al. |
| 2014/0043242 | A1 | 2/2014 | Dietz et al. |
| 2014/0078109 | A1 | 3/2014 | Armstrong Muntner |
| 2014/0191967 | A1 | 7/2014 | Rhee |
| 2014/0253469 | A1 | 9/2014 | Hicks et al. |
| 2014/0268515 | A1 | 9/2014 | Smoot et al. |
| 2015/0169056 | A1* | 6/2015 | Weddle ................ G06F 3/0414 345/173 |
| 2016/0188015 | A1* | 6/2016 | Song ...................... G06F 3/016 345/179 |

OTHER PUBLICATIONS

Moscatelli et al., "A Change in the Fingertip Contact Area Induces an Illusory Displacement of the Finger", EuroHaptics Conference Proceedings, 2014, Part II, LNCS 8619, 72-79.
Reznik, "The Universal Planar Manipulator", University of California at Berkley, 2000; 132 Pages.
Wiertlewski et al., "A High-Fidelity Surface-Haptic Device for Texture Rendering on Bare Finger", EuroHaptics Conference Proceedings, 2014, Part II, LNCS 8619, pp. 241-248.
Dai et al., "LateralPaD: A Surface-Haptic Device That Produces Lateral Forces on a Bare Finger", IEEE Haptics Symposium Mar. 4-7, 2012; pp. 7-14.
Yang, "Design and Control of an Integrated Haptic Interface for Touch Screen Applications", Lille1 University, 2013; 185 pgs.
Darby et al., "Modeling and Control . . . Slip-Stick Actuators", Journal of Guidance, Control, and Dynamics, vol. 22, No. 1 Jan.-Feb. 1999, pp. 36-42.
Chubb et al., "ShiverPaD: A Glass Haptic Surface . . . on a Bare Finger", IEEE Transactions on Haptics, vol. 3, No. 3, Jul.-Sep. 2010, pp. 189-198.
Giraud et al., "Design of a Transparent Tactile Stimulator", IEEE Haptics Symposium Mar. 4-7, 2012, p. 485-489.
Gleeson et al., "Perception of Direction . . . Repetition", IEEE Transactions on Haptics, vol. 3 No. 3, Jul.-Sep. 2010, pp. 177-188.
Winfield et al., "T-PaD: Tactile Pattern Display through Variable Friction Reduction", Second Joint EuroHaptics Conference . . . Teleoperator Systems, 2007, pp. 421-426.
Kaye, "Sawtooth Planar Waves for Haptic Feedback", Adjunct Proceedings of the 25th Annual ACM Symposium on User Interface Software and Technology, 2010, pp. 5-6.
Derler et al., "Stick-slip Phenomena in the Friction of Human Skin", Wear, vol. 301, 2013, pp. 324-329.
Awrejcewicz et al., "Occurrence of Stick-slip Phenomenon", Journal of Theoretical and Applied Mechanics, vol. 45 No. 1, 2007, pp. 33-40.
Evreinova et al., "From Kinesthetic Sense to New Interaction Concepts: Feasibility and Constraints", International Journal of Advanced Computer Technology, 2014; 33 Pages.
Evreinova et al., "Virtual Sectioning . . . of Volumetric Shapes in the Absence of Visual Feedback", Advances in Human-Computer Interaction, 2013, Article ID:740324, 15 pgs.
Withana et al., "ImpAct: Immersive Haptic Stylus to Enable Direct Touch and Manipulation for Surface Computing", ACM Computers in Entertainment, vol. 8 No. 2, Dec. 2010; 16 Pgs.
Lee et al., "Beyond—Collapsible Tools and Gestures for Computational Design", CHI 2010: Work-in-Progress, Apr. 14-15, 2010, pp. 3931-3936.
Yager et al. "Light-Induced Nanostructure Formation Using Azobenzene Polymers", Chapter 8 in Light-Induced Nanostructure Formation using Azobenzene Polymers, 2006, pp. 1-38.
Evreinova et al., "Non-visual . . . Directional-predictive Sounds and Vibrations: A Comparative Study", Springer-Verlag, Oct. 30, 2007, pp. 93-102.
Evreinova et al., "Evaluation of Effectiveness . . . Digital Maps", International Journal of Computer Science and Applications, vol. 9 No. 3, 2012, pp. 61-76.
Evreinova et al., "Haptic Visualization of Bathymetric Data", IEEE Haptics Symposium, Mar. 4-7, 2012, pp. 359-364.
Nagasaka, "Haptistylus: Stylus for Unified Manipulations", http://oshiro.bpe.es.osaka-u.ac.jp/research/cgvr, 2015, 60 pgs, (English Abstract).
Roudaut et al., "Gesture Output: Eyes-Free Output Using a Force Feedback Touch Surface", CHI 2013: Changing Perspectives, 2013, pp. 2547-2556.
Saga et al., "Simultaneous Geometry and Texture Display Based on Lateral Force for Touchscreen", IEEE World Haptics Conference, Apr. 14-18, 2013, pp. 437-442.
Miruchna et al., "GelTouch: Localized Tactile Feedback Through Thin, Programmable Gel", UIST '15, Nov. 8-11, 2015; 8 Pages.

\* cited by examiner

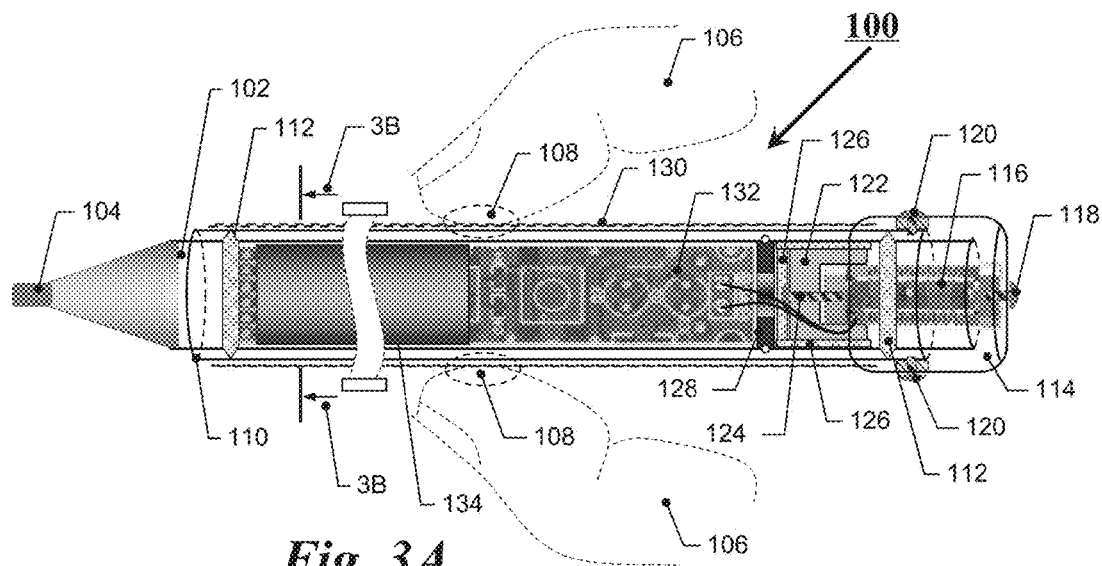
*Fig. 3A*
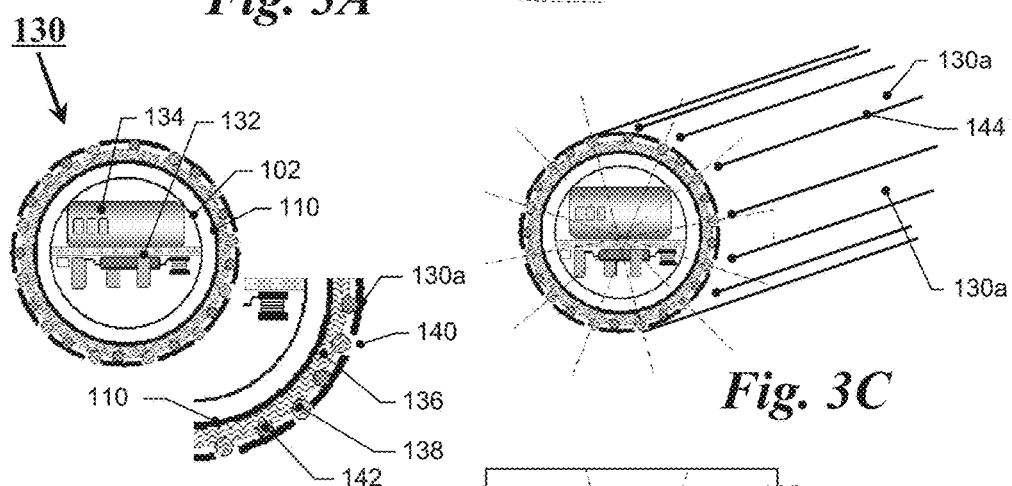
*Fig. 3B*
*Fig. 3C*
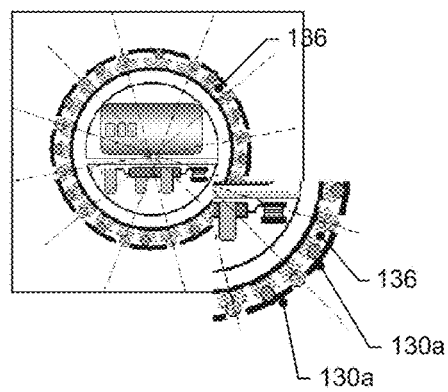
*Fig. 3D*

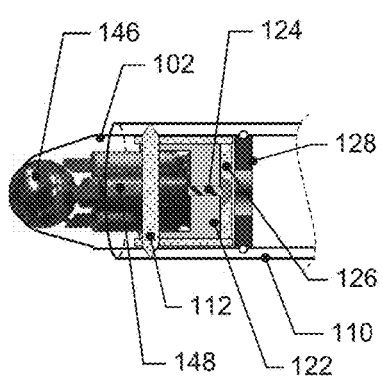 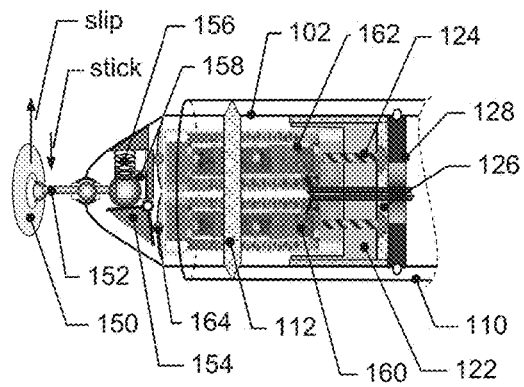
*Fig. 7A*  *Fig. 7B*

HAPTIC STYLUS

CROSS-REFERENCE TO RELATED APPLICATION(S)

This application claims priority from Japanese Patent Application No. 2015-066079 filed on Mar. 27, 2015, the entire contents of which are incorporated herein by reference.

TECHNICAL FIELD

The present invention relates generally to a haptic stylus, particularly to a haptic stylus for interaction with an interaction surface, such as a touch screen.

BACKGROUND ART

Any variable parameter (signal) that can be controlled by human (the user) and recorded in a digital form can be used to encode input information affecting the computer functionality. However, the computer functionality to interact with the user is limited to a passive presentation of information in different types of messages delivered through signals of different modalities: auditory, visual and tactile. Both the size and power consumption of wearable devices restrict the output capabilities, the computer is able to perform to support interaction techniques. Touch screens, in particular, are becoming increasingly popular because of their high sensitivity to detect a location and pressure of an input device (a stylus tip) or a finger tip and advantages of the direct manipulation interface. In this context, manipulation still means the user input that has an effect on the program execution.

However, finger-based interaction has a limited duration of the contact between fingertip and touchscreen (direct input) to avoid visual occlusion of imaging (in a case of the use a visual output). The short contact constraints the time during that it would be possible to apply and perceive mechanical energy variations in a kind of tactile signals (forces, vibrations and/or movements) in fingers to present complex information through tactile channel. On the other hand, tactile information presented during finger movements (gesture) cannot be referred to a specific point of contact at a specific moment of time. Though, instead of the direct feedback the user is able to feel different sensations by other hand continuously holding the portable electronic device, an interpretation of tactile information delivered from the back of the device and presented to the contralateral hand can cause a spatial discordance of the depth perception and localization when tactile signals have to be integrated with the visual information in a specific manner (e.g., in a case of ambiguous images, depth cues, etc).

A stylus is a universal mediator of the user input that can be used with various devices in a manner as a regular pen or pencil, e.g. with Personal Digital Assistants (PDA), personal computers, mobile phones, smart watches (US-2014/0035884-A) and any other portable electronic device to input information in a textual, graphical and pictorial form (US-2014/0078109-A). It also improves the precision of the touch input rather than using a finger, allowing use of handwriting and micro-movements.

Nowadays, advanced styluses have extended input-output capabilities for input spell check and notification (US-2014/0253469-A, US-2005/0125228-A), by interacting with a smart phone as a Bluetooth headset (US-2012/0139879-A) and for input as a wireless 3D manipulandum (US-2014/0191967-A, US-2002/0084114-A, US-2013/0002614-A, WO-2013-003128-A). A stylus input can be used for simulating different physical qualities (stiffness, compliance, elasticity, rigidity, inertia, friction, impedance etc.) and associated perceptual qualities of materials, textures and other sensory experience. Through the stylus mediating human-computer interaction, the user is able to perceive different local properties of the virtual objects and materials such as hard, soft, sticky, and other region/shape descriptors and features as a texture gradient (slippery, silky, velvety, bumpy, smooth), concavity and convexity, edges and so on (US-2009/0079703-A, US-2014/0043242-A, U.S. Pat. No. 8,681,130-B, U.S. Pat. No. 8,749,533-B, U.S. Pat. No. 8,773,403-B, US-2012/0293463-A, US-2012/0127088-A, Wintergerst G. et al., "*Reflective Haptics: Enhancing Stylus based interactions on touch screen*", EuroHaptics Conference Proceedings, 2010, Part I, LNCS 6191, 360-366).

Nowadays, in advanced multimodal interfaces besides spatial audio, enhancement of graphic cues is often based on the use of a haptic sense (Evreinova T. V et al., "*Virtual Sectioning and Haptic Exploration of Volumetric Shapes in the Absence of Visual Feedback*", Advances in Human-Computer Interaction, 2013, Article ID: 740324). Many stationary (desktop) and mobile (linkage-free) input devices have been developed to augment visual interaction with three-dimensional objects through complementary haptic sense (U.S. Pat. No. 5,642,469-A, Yang "*Design and Control of an integrated haptic interface for touch screen applications*", Ph.D. thesis in Lille1 University, France, 2013, Evreinova T. V. et al., "*From Kinesthetic Sense to New Interaction Concepts: Feasibility and Constraints*", International Journal of Advanced Computer Technology, 2014, 3, 4, 1-33). Various solutions for different kinds of devices in three-dimensional pointing mostly rely on enhanced visual feedback even when the user can apply different pressure on a stylus tip to change the cursor location along the direction of the normal force applied (e.g., US-2009/0079703-A, WO-2011-061395-A, US-2008/0225007-A, US-2012/0206419-A, Withana A. et al., "*ImpAct: Immersive haptic stylus to enable direct touch and manipulation for surface computing*", ACM Computers in Entertainment, 2010, 8, 2, Article 9, Lee J. et al., "*Beyond-Collapsible Tools and Gestures for Computational Design*", CHI2010, 2010, 3931-3936, Nagasaka S. "*Haptistylus: Stylus for Unified Manipulations*", 2015, available at: http://oshiro.bpe.es.osaka-u.ac.jp/research/cgvr.html).

However, to our knowledge and understanding the solutions mentioned above are able only to simulate the feelings that the user can sense by moving a stylus/pen or a paintbrush across a piece of paper or a canvas, while these solutions cannot actively move the stylus/pen or/and the user's hand with respect to the stylus or with respect to the surface of interaction (Moscatelli A. et al., "*A change in the fingertip contact area induces an illusory displacement of the finger*", EuroHaptics Conference Proceedings, 2014, Part II, LNCS 8619, 72-79). For example, US-2012/0127088-A discloses that "In some embodiments, the haptic actuator may further generate haptic feedback that can be felt by the nerves of a user's fingers without physically moving the body of the haptic input device." (paragraph [0042]). US-2014/0043242-A discloses a method for guiding a stylus on a surface of a touchscreen by moving the stylus across the surface while varying the friction based on a location of the stylus. The friction is modulated such that a region of the surface has a higher friction than areas immediately surrounding the region so as to bias the stylus towards the region, by guiding the user towards appropriate strokes (claim 20, par [0061], [0062]).

Nevertheless, the guidance that contains ambiguity and is not able to present an exact way to solve the task can fail in the absence of visual feedback and prior knowledge (pre-existing attitudes, experiences, and mental templates). By other words, when the user is not able to exactly track/cross the areas having a low coefficient of friction in a specific direction, an exploration of areas surrounding the stylus tip region disintegrates kinesthetic information or complicates filtering and integration of kinesthetic information by hindering an appearance of the holistic mental representation of the path (appropriate strokes) needed to follow to complete a task. To optimize learning for the specific handwriting skills, the guidance has to facilitate filtering and integration of the kinesthetic information by applying the tangential vector of force moving the stylus along the needed pathways, while avoiding any exploratory extra movements. Still besides the known solutions for desktop devices (U.S. Pat. No. 5,642,469-A, U.S. Pat. No. 8,432,361-B, U.S. Pat. No. 8,725,292-B, US-2005/0065649-A, US-2010/0042258-A, WO-2004-095170-A, Evreinova T. V et al., "*From Kinesthetic Sense to New Interaction Concepts: Feasibility and Constraints*", International Journal of Advanced Computer Technology, 2014, 3, 4, 1-33), there have not been published any attempts of implementing autonomously movable (self-propelling) stylus, pen or stick for a mobile interaction (Nagasaka S. "Haptistylus: Stylus for Unified Manipulations", 2015, available at: http://oshiro.bpe.es.osaka-u.ac.jp/research/cgvr.html).

For example, by producing push and pull forces in synchronization with altering static and kinetic friction forces, it is possible to create a displacement vector to an object in a given direction with respect to a supporting surface (U.S. Pat. No. 3,957,162-A, U.S. Pat. No. 8,230,990-B, U.S. Pat. No. 6,841,899-B, Reznik D. S., "The Universal Planar Manipulator", Ph. D. thesis in University of California at Berkeley, 2000, Darby A. P. et al., "*Modeling and Control of a Flexible Structure Incorporating Inertial Slip-Stick Actuators*", Journal of Guidance, Control, And Dynamics, 1999, 22, 1, 36-42, Awrejcewicz J. et al., "*Occurrence of Stick-Slip Phenomenon*", Journal of Theoretical and Applied Mechanics, 2007, 45, 1, 33-40). Herewith, there is a strong interest in a haptic society to apply the controllable friction, tangential force and displacement in the absence of any mechanical linkage to the user's fingerpad when s/he interacts via touchscreen with a portable electronic device (U.S. Pat. No. 8,525,778-B, Wiertlewski M. et al., "*A High-Fidelity Surface-Haptic Device for Texture Rendering on Bare Finger*", EuroHaptics Conference Proceedings, 2014, Part II, LNCS 8619, 241-248, Dai X. et al., "*LateralPaD: A Surface-Haptic Device That Produces Lateral Forces on A Bare Finger*", IEEE Haptics Symposium, 2012, 7-14, Chubb E. C. et al., "*ShiverPaD: A Glass Haptic Surface That Produces Shear Force on a Bare Finger*", IEEE Transactions on Haptics, 2010, 3, 3, 189-198, Giraud F. et al., "*Design of a transparent tactile stimulator*", Haptics Symposium, 2012, 485-489, Gleeson B. T. et al., "*Perception of Direction for Applied Tangential Skin Displacement: Effects of Speed, Displacement, and Repetition*", IEEE Transactions on Haptics, 2010, 3, 3, 177-188, Winfield L. et al., "*T-PaD: Tactile Pattern Display through Variable Friction Reduction*", Second Joint EuroHaptics Conference and Symposium on Haptic Interfaces for Virtual Environment and Teleoperator Systems, 2007, 421-426, Kaye J. J., "*Sawtooth planar waves for haptic feedback*", Adjunct proceedings of the 25th annual ACM symposium on User interface software and technology, 2010, 5-6, Roudaut A. et al., "*Gesture Output: Eyes-Free Output Using a Force Feedback Touch Surface*", CHI2013, 2013, 2547-2556, Saga S. et al., "*Simultaneous geometry and texture display based on lateral force for touchscreen*", IEEE World Haptics Conference, 2013, 437-442). For example, Derler S. et al., "*Stick-slip phenomena in the friction of human skin*", Wear, 2013, 301, 324-329 mentions the stick-slip behavior of the index fingerpad sliding on wet, smooth glass as a function of normal force and sliding velocity in friction measurements using a tri-axial force plate.

In general, the friction coefficients during the stick-slip phase of sliding were 30% lower than those in a stationary phase of sliding. During a stick-slip phase, the amplitude of the friction coefficient also varied more than twice greater than during a stationary phase of sliding. As soon as new materials and actuators are available, the stick-slip phenomenon can be realized on a portable electronic device and in designing the stylus as a mediator of interaction with portable electronic devices. This can significantly extend functionalities of the stylus-based interaction that has been realized in the present invention.

SUMMARY

This invention is made in view of the above-mentioned problems, and one object of the invention is to provide a haptic stylus which can move with respect to the user's fingers gripping/holding the haptic stylus along a longitudinal direction.

One aspect of the present invention provides, a haptic stylus, including: a stylus housing; a stylus tip attached to one end of the stylus housing, so as to be in contact with an interaction surface, such as a touchscreen; a stylus covering attached to a circumference of the stylus housing, so as to be movable with respect to the stylus housing along a longitudinal direction of the haptic stylus and so as to be gripped/held by user's fingers; and a first actuator configured to activate the stylus housing to thereby cause a stick-slip phenomenon between the stylus covering and the user's fingers gripping/holding the stylus covering, thereby allowing the user's fingers to grip/hold the stylus covering while moving along the longitudinal direction of the haptic stylus.

According to the above-mentioned configuration, since a haptic stylus is enabled to move with respect to the user's fingers gripping/holding the haptic stylus along a longitudinal direction, for example, it is possible to guide the user's hand in accordance with a provided task.

BRIEF DESCRIPTION OF DRAWINGS

FIGS. 3A to 3D are cross-sectional views of the haptic stylus, particularly of the stylus covering thereof.

FIGS. 7A and 7B illustrates exemplary configuration variations of the motorized stylus tip of the haptic stylus according to the embodiment.

FIGS. 8A to 8C illustrate a haptic contact surface capable of interacting with the haptic stylus according to the embodiment, in which FIG. 8A shows a top view, FIG. B shows a bottom view and FIG. 8C shows a cross-sectional view.

FIGS. 9A and 9B illustrate another example of a haptic contact surface, in which FIG. 9A shows a perspective view and FIG. 9B shows a top view.

DESCRIPTION OF EMBODIMENT

Figure 1:
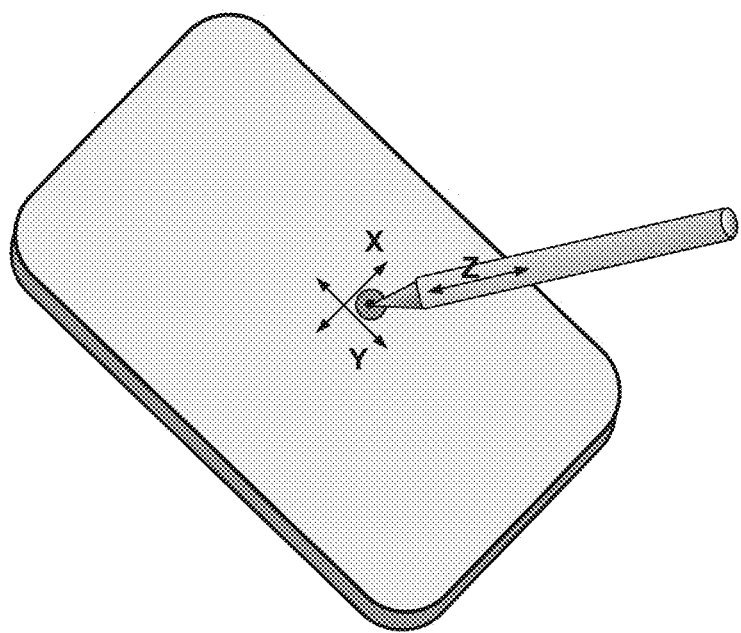
FIG. 1 illustrates coercive movements with respect to the user hand gripping and holding a haptic stylus according to the embodiment.

An embodiment will be described with reference to the accompanying drawings. In the drawings and the description, the same reference numbers are used to refer to the same or like parts.

The embodiment provides a haptic stylus capable of guiding the user's hand in accordance with a provided task.

For example, during interaction with a flat surface of the touchscreen hand movements of the user fingers holding the stylus along the longitudinal axis up and down, that is closer or further/away of the stylus tip, can simulate and enhance visual and haptic descriptors of the virtual surfaces such as 3D features and texture-based properties. The stylus or its virtual counterpart can sink into a particular layer of the environment, virtual biological or physical structure. Active stylus covering could help the user to stay at the specific level of one assigned parameter while making an exploration of other features, characteristics or parameters, for instance, by examining turbulence models for the large-scale systems, as ocean currents and atmospheric phenomena on the Earth and other planets, and for nano-scale hydrodynamics in biological cellular channels.

Figure 2:
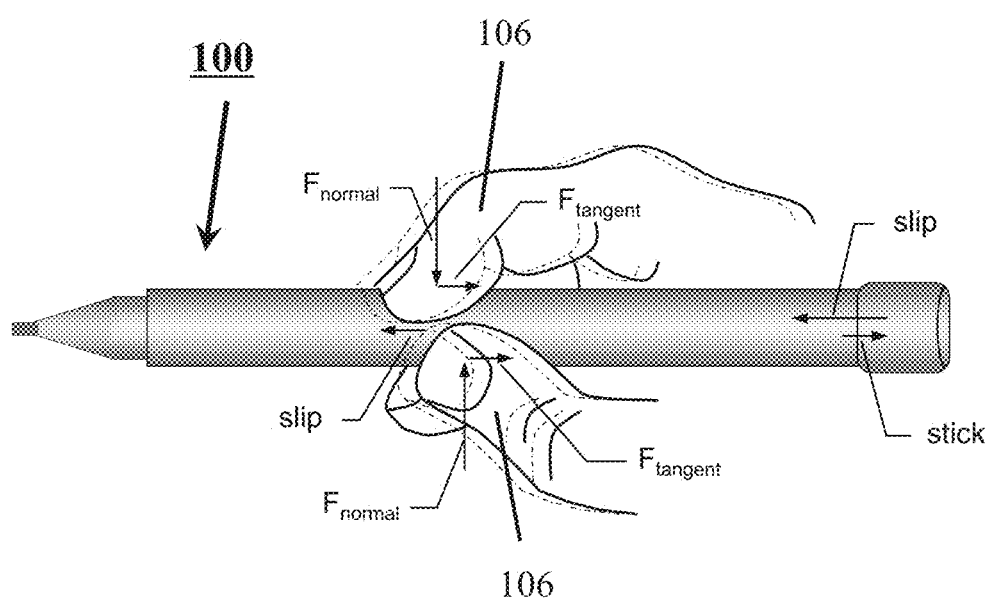
FIG. 2 illustrates the basic concept of the user's hand movements according to the embodiment, and a distribution of forces in the contact area of the user finger and the stylus covering due to the stick-slip phenomenon and the inertia phenomenon.

FIG. 1 illustrates coercive movements to be applied from a haptic stylus 100 according to the embodiment to the user's hand gripping the haptic stylus 100. FIG. 2 illustrates the basic concept of the embodiment, particularly a distribution of forces in the contact area of the user finger 106 and the stylus covering 130 for realizing the user's hand movements.

As shown in FIGS. 1 and 2, the haptic stylus 100 is used in a contact with a surface of a touchscreen. According to the embodiment, the haptic stylus is capable of performing movements in two directions of X- and Y-axes, which are orthogonal with each other, across the surface of interaction by generating coercive forces on the stylus tip 104 to travel across the surface of the touchscreen, using the stick-slip phenomenon and the inertia phenomenon.

Alternatively/Additionally, the movements in two directions of X- and Y-axes may be realized/assisted by configuring a haptic contact surface to generate forces to be applied to the stylus tip 104.

Moreover, the haptic stylus 100 is capable of moving with respect to the user fingers 106 gripping and holding the haptic stylus 100 along the longitudinal Z-axis. This movement in direction of Z-axis is realized by generating tangential forces on the stylus covering 130, using the stick-slip phenomenon and the inertia phenomenon.

While the movements in two directions of X- and Y-axes may be generated by providing actuators to at least one of the stylus tip of the haptic stylus and the touchscreen as the haptic contact screen, the movement in direction of Z-axis is realized only by providing actuators to the stylus covering of the haptic stylus.

As shown in FIG. 3A, the haptic stylus 100 has the stylus tip 104. The location of the stylus tip 104 with respect to the surface of interaction is detectable using any known detection techniques, that is, using capacitive, inductive, ultrasonic, electromagnetic, video-based or another suitable contact or remote/proximity sensors/detectors.

In the embodiment, the haptic stylus 100 may have a pressure sensor (for example, a stylus tip pressure sensor 182, which will be described later) capable of detecting a pressure applied to a stylus tip 104 when it is in contact with the surface of interaction. The pressure sensor may be provided near the stylus tip 104. Specifically, the pressure sensor may be provided on the printed circuit board 132. Alternatively/additionally, a pressure sensor may be provided near the surface of interaction, that is, within the portable electronic device.

On the printed circuit board 132, components to support the various functionalities of the haptic stylus 100 are mounted. The mounted components include the embedded sensors/detectors, actuators and controllers, information processing units and communication units. The haptic stylus 100 may communicate with an external portable electronic device through the embedded communication units. In more detail, these components will be discussed with regard to FIG. 4. For the sake of simplification, illustrations of the printed circuit board 132 and the power supply 134 may be occasionally omitted.

In the embodiment, an actuator (first actuator) 116 is provided around a rear end of the haptic stylus 100. However, the location of the actuator 116 is not limited thereto. The actuator 116 generates and provides a force on the stylus covering 130 using the stick-slip phenomenon and the inertia phenomenon. As a result, the stylus covering 130 is allowed to move in direction of Z-axis with respect to the user's fingers 106 gripping the stylus covering 130. The actuator 116 may be configured, although it is not limited thereto, from piezoelectric, magnetostrictive, electromagnetic (voice-coil), pneumatic, hydraulic, dielectric elastomer actuators or a like.

A tubular base 110 of the stylus covering 130 is provided around a stylus housing with a gap. An additional end-mass 122 is affixed to one end of the actuator 116 with a screw 124 to adjust inertial force to the resonance frequency of movable system of the stylus covering 130. And, a cap 114 is affixed to the opposite side of the actuator 116 with a screw 118, and is also affixed to the tubular base 110. Thus, the longitudinal movement of the actuator 116 is transferred to the base 110 of the stylus covering 130 through the cap 114.

By applying the positive or negative sawtooth waveform signals to the actuator 116, the end-mass 122 of the actuator 116 is oscillated to generate unbalanced axial forces to the stylus covering 130 via the cap 114. This oscillation caused due to the sawtooth waveform signals allows the user's fingers grasping/holding the haptic stylus 100 to move in the longitudinal directions due to the stick-slip phenomenon and the inertia phenomenon.

In the embodiment, to decrease friction between the movable components, the tubular base 110 of the stylus covering 130 is separated from the stylus housing 102 with inserts 112. The inserts 112 may be provided to have a minimal friction and contact area with respect to the base 110. The end-mass 122 is separated from the stylus housing 102 (the stop washer 128) with a thermally conductive silicone rubber material 126 to attenuate unnecessary components of vibration and to dissipate heat of the actuator 116 (e.g., the piezoelectric actuator).

In general, a stylus covering may be made from a specific material having the static friction coefficient to human skin which, at least, three times higher than dynamic friction coefficient (according to Derler S. et al., "*Stick-slip phenomena in the friction of human skin*", Wear, 2013, 301, 324-329), during stick and slip conditions correspondingly.

Nevertheless, in the preferred embodiment, the stylus covering 130 has a more complex structure and extended functionalities illustrated by the cross-sectional views of FIGS. 3B to 3D, and large-scale details.

As shown in FIG. 3B, in the preferred embodiment, the stylus covering 130 includes the tubular base 110, an external shell 130a provided around the base 110, and a dielectric elastomer material 136 filled within the space between the base 110 and the external shell 130a.

The dielectric elastomer material 136 acts as both the sensor/detector and actuator (second actuator). For example, when the user squeeze the external shell 130a, dots/pins/ridges 138 raised therefrom receive the normal force from the user's fingers 106, and the elastomer material 136 measures the received normal force, for example, through the capacitance change. In addition, by previously stressing the dielectric elastomer 136 and applying a high DC voltage between the base 110 and an internal conductor 142, the pre-stressed dielectric elastomer 136 sandwiched between the base 110 and the internal conductor 142 is relaxed to thereby act as an EAP (electroactive polymer) actuator. The relaxed dielectric elastomer 136 pushes out the pins 138 which are made of elastic material having a friction higher than that of the external shell 130a of the stylus covering 130. This movement of the stylus covering 130 provides a tactile sense of textured surface that can vary as the user's fingers 106 travel along the stylus covering 130.

Thus, the stylus covering 130 not only can sense the movement of the user's fingers 106, and but also can stimulate different tactile sensation. Since the stylus covering 130 is capable of detecting the location and pressure of the user's fingers 106, it is also capable of detecting the commands inputted from the user as a manipulation of swiping, squeezing, and tapping on a surface of the stylus covering 130.

In the preferred embodiment (FIG. 3C), the stylus covering 130 is segmented in a longitudinal direction herewith the dielectric elastomer 136 as an EAP actuator pushed out the pins 138 through the holes 140 located along the splits 144, while the raised dots/pins/ridges 138 are located under the respective segments of the stylus covering 130. However, the EAP is not necessary to be segmented as illustrated in FIG. 3D, and whether or not the EAP is segmented can be selected by the manufacturer depending on the situation, as illustrated in FIGS. 6A to 6F.

Figure 4:
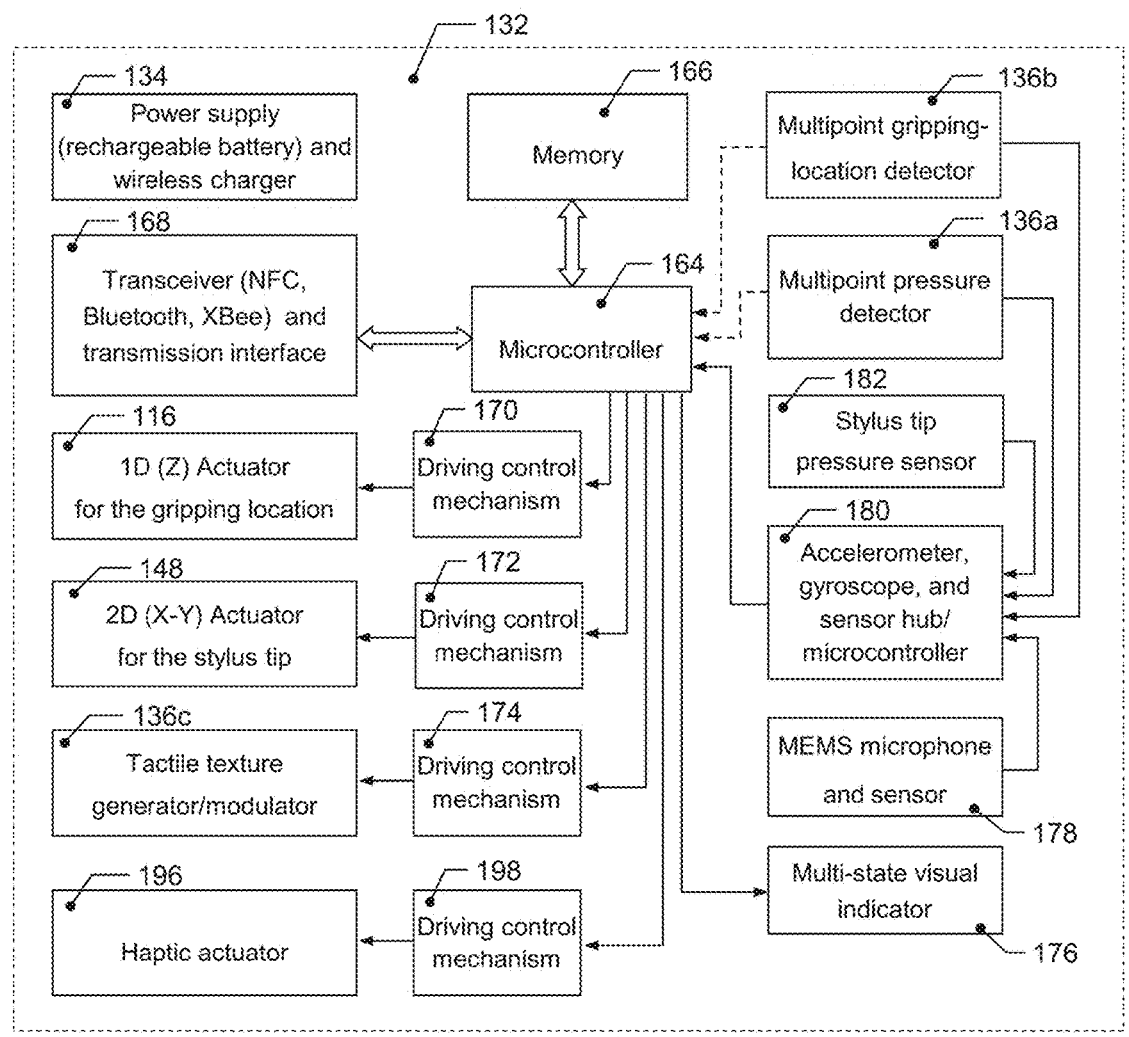
FIG. 4 is a schematic diagram illustrating a controlling section of the haptic stylus according to the embodiment.

FIG. 4 is a schematic diagram of illustrating a controlling section of the haptic stylus 100. As shown in FIG. 4, the printed circuit board 132 contains the component 180 needed to detect spatial position of the stylus housing 102 with respect to the surface of interaction. In a preferred embodiment, the component 180 is a processor-based microcontroller incorporating a MEMS sensor/detector hub, a 3D digital accelerometer and a 3D digital gyroscope.

This component 180 is able to perform preprocessing of information gathered by other sensors/detectors: MEMS microphone and vibration sensor 178, stylus tip pressure sensor 182, multipoint pressure detector 136a, and multipoint gripping-location detector 136b. The multipoint pressure detector 136a and the multipoint gripping-location detector 136b correspond to functions of the dielectric elastomer 136 as a sensor/detector, as shown in FIGS. 3B to 3D. Although FIG. 4 shows an example in which the multipoint pressure detector 136a and the multipoint gripping-location detector 136b are connected to the component 180, the multipoint pressure detector 136a and the multipoint gripping-location detector 136b may be directly connected to the main processor-based microcontroller 164.

Based on information collected from the multiple sensors/detectors, microcontroller 164 performs the following operations:

a control (via displacements in two opposite directions) of the fingers' 106 grip position 108 with respect to the haptic stylus 100 using the actuator 116, a stylus location with respect to the surface of interaction using the actuator 148 of the stylus tip 104, a wireless communication between the haptic stylus 100 and an external portable electronic device 184, management of the complementary tactile signals generated by the dielectric elastomer 136 as the tactile texture generator/modulator 136c and the haptic actuator 196, and imaging necessary visual signals on the multi-state indicator 76.

Figure 5:
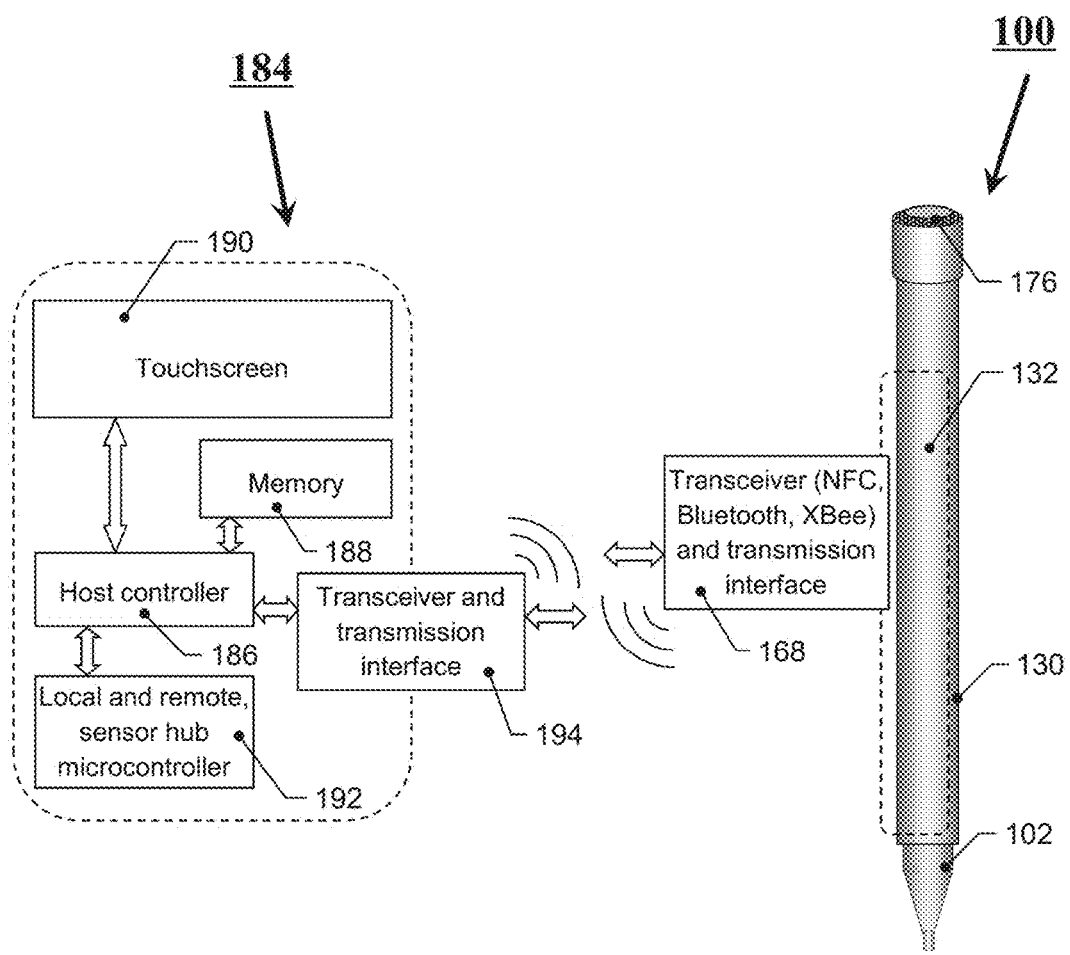
FIG. 5 is a schematic diagram illustrating a communication between an electronic device and the haptic stylus according to the embodiment.

The printed circuit board 132 also contains a memory 166, controllers 170, 172, 174, and 198, internal power supply 134 and transceiver 168 supporting communication with an external device 184 (FIG. 5). Herewith, a driving control mechanism 170 provides the actuator 116 with a specific sawtooth waveform of the output signals having a given magnitude and frequency. A driving control mechanism 172 provides the actuator 148 of the stylus tip 104 with the output signals able to drive or/and correct the position of the stylus tip 104 against the user input movements when necessary.

In a case of the use other types of actuators (e.g., magnetostrictive or dielectric elastomer-based actuators) the driving control mechanisms provide the signals parameters of which fit to other type of actuators. Similarly, a driving control mechanism 174 and 198 provide the output signals appropriate for the dielectric elastomer 136 as the tactile texture generator/modulator 136c and the haptic actuator 196.

Memory 166 can include semi-permanent memory such as RAM, and/or one or more different types of memory used for storing data. Namely, memory 166 is used for storing any type of data (e.g., parameters of specific trajectories of symbols, letters, hieroglyphs, basic geometric shapes, and other linguistic and grammatical features, patterns of simulated textures, vibration signals, and tactile effects) to operate by driving control mechanisms in accordance with different scenarios of using the haptic stylus 100, and anticipated behavior of the user.

A power supply 134 is intended to convert DC power of a rechargeable battery into various DC voltages needed to run all the components serving functionalities of the haptic stylus 100. A power supply 134 also maintains charging the embedded battery.

A multi-state visual indicator 176 indicates the battery status and charging mode, activating the stylus, a selection of the specific task when it was made by the user or was detected automatically, and displays the warning signals regarding the mode, failure or/and application running on a portable electronic device.

FIG. 5 illustrates in a simplified manner information transfer between the haptic stylus 102 and a portable electronic device 184.

A host controller 186 is able to perform more sophisticated analysis at both a global and a local level of the specific context, event, attributes and functions to match the correspondence of user behavior to the application scenario in more detail. Moreover, the host controller 186 can prioritize information and interaction features adapting to various scenarios and corresponding to user's behavior within various applications. The host controller 186 is able to deploy and run an arbitrary application that would require significant computational resources.

The portable electronic device 184 could have a larger storage capacity of the memory 188 as compared to the embedded memory 166 of the stylus 102 as well as having higher resolution of local and remote sensors 192, which can increase the accuracy of measuring various parameters of the user's behavior and stylus-based manipulations using advanced algorithms relying on machine learning and statistical models of prediction and approximation.

Figure 6A:
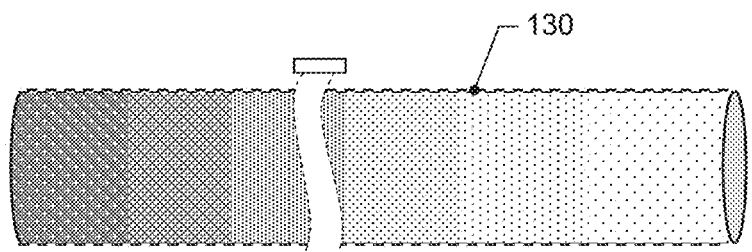
FIGS. 6A to 6F illustrate exemplary configuration variations of the stylus covering of the haptic stylus according to the embodiment.

FIGS. 6A to 6F illustrates exemplary configuration variations of the stylus covering 130. In FIG. 6A, the base 110 of the stylus covering 130 is assumed to have a tubular shape (FIGS. 3A to 3D).

In a preferred embodiment, the stylus covering 130 has a pattern of engraved texture with a specific gradient of the textured elements. The texture gradient can be presented continuously or being segmented into a number of zones of well distinguishable by touch. In another embodiment the tubular base 110 (FIGS. 3A to 3D) can be covered with a composite light-sensitive or thermoresponsive nanostructured material (e.g., azobenzene) that is able to change friction (Yager K. G et al., "*Light-Induced Nanostructure Formation using Azobenzene Polymers*", Ch. 8 in Polymeric Nanostructures and Their Applications, 2006, 0, 1-38) by demonstrating light-induced photoisomerization when altering trans-form into cis-form. Similar smart material sensitive to temperature/heating (Miruchna V. et al., "*GelTouch: Localized Tactile Feedback Through Thin, Programmable Gel*", UIST2015, 2015, 3-10), to a specific optical spectrum, electrical or magnetic field can be used as well.

Herewith, the composite material could have in its structure embedded optical, magnetic or electro-conductive fibers having proper parameters to induce isomerization or polymerization process. Such an embodiment allows to dynamically change the friction when the user's fingertips 106 travel along the stylus covering 130.

Figure 6B:
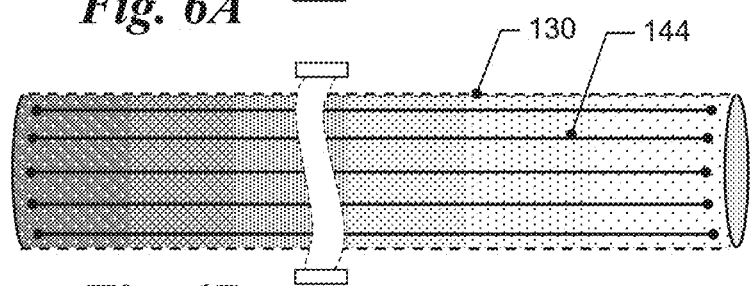

FIG. 6B illustrates the case of the stylus covering 130 having the gradient texture and the base 110 (FIGS. 3A to 3D) being segmented along the longitudinal axis.

Such an embodiment assumes that the user would be able not only to grip and hold the stylus covering 130 by perceiving the specific tactile sensations when the stylus covering 130 moves under the user's fingers 106, but would be able to use the stylus covering 130 as an interactive surface. Thus, the user would be able to press/squeeze or click/tap onto separate segments with a different force that would be detected and recognized as a specific command to initialize/configure or customize an application, to select the needed/specific mode or to respond to some event, or for the user identification (based on pressure redistribution and information collected from other sensors/detectors when the password entered by handwriting needs to be verified).

Moreover, when interacting with an external portable electronic device 184, such a surface of interaction can realize a more advanced functionality of the multidimensional volumetric touch input. That is, the functionality of the stylus covering 130 could be dynamically altered depends on the position of the stylus tip 104 on a touchscreen and a spatial position of the portable electronic device 184, the application context and other parameters.

Figure 6C:
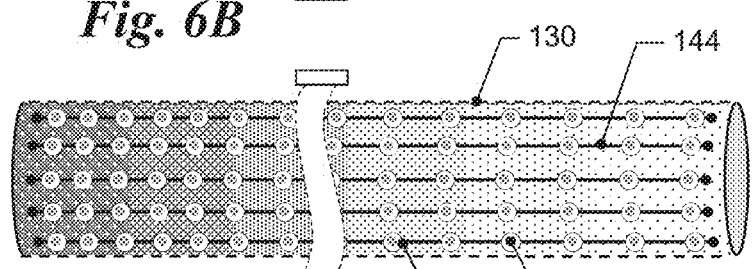

FIG. 6C illustrates the case of the stylus covering 130 having the gradient texture, the segmented base 110 (FIGS. 3A to 3D), and the holes 140 through which the pins 138 of elastic material having a higher friction than the stylus covering 130 can be pushed out to mechanically change the friction between the stylus covering 130 and the user's fingertips 106. Such an embodiment allows to dynamically change the friction when the user's fingertips 106 travel along the stylus covering 130. In a preferred embodiment, the holes 140 are arranged along slits 144 of the segmented external shell of the stylus covering 130.

In another embodiment (FIG. 6D), the pins 138 of elastic material having a higher friction than the stylus covering 130 can be pushed out through the holes 140 arranged along the longitudinal axis of the stylus covering 130. Moreover, the holes 140 may have a specific gradient of density of the holes 140 along the longitudinal axis of the stylus covering 130.

In another embodiment (FIG. 6E), the stylus covering 130 can be segmented on the parallel slices that are being perpendicular to the longitudinal axis of the stylus covering 130.

Figure 6D:
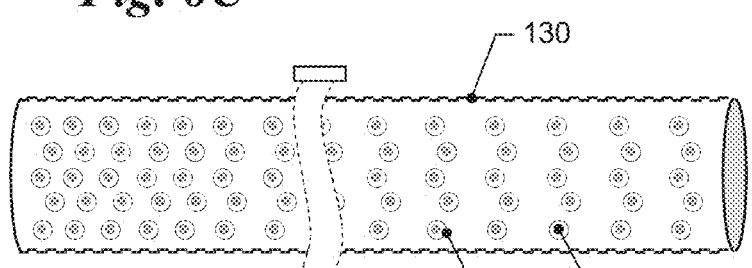
Figure 6E:
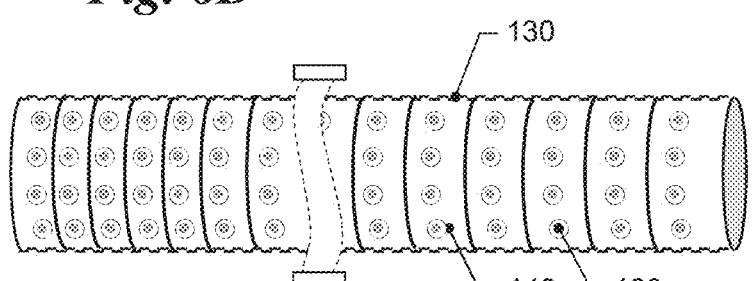
Figure 6F:
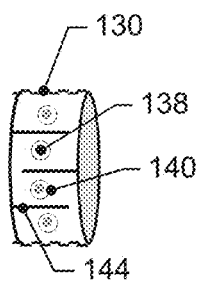

FIG. 6F illustrates the slice of the stylus covering 130 being additionally segmented within each slice of the stylus covering 130. Herewith, the external shell of the stylus covering 130 within each slice (FIG. 6F) can be additionally segmented to allow extending individual pins 138 through the holes 140 within each slice sequentially, by simulating the specific tactile feelings that swirl around the stylus covering 130 clockwise or counter clockwise.

FIGS. 7A and 7B illustrate exemplary configuration variations of the motorized stylus tip that can generate forces to move the stylus tip with respect to the contact surface in X-Y directions while being gripped and held by the user's hand.

FIG. 7A illustrates a preferred embodiment of the stylus housing 102 with embedded spherical motor (third actuator) 148 supporting the haptic stylus displacements across the surface of interaction in two dimensions of X- and Y-axes (FIG. 1).

To decrease friction between the movable components, the base 110 of the stylus covering 130 is separated from the stylus housing 102 via an insert 112 having a minimal friction and area of the contact with the base 110.

The end-mass 122 is separated from the stylus housing 102 and the stop washer 128 with the thermally conductive silicone rubber material 126 to attenuate unnecessary components of vibration and to dissipate heating of magnetostrictive actuators used in the design of the spherical motor 148.

The spherical motor 148 is affixed to an additional end-mass 122 with a screw 124. Thus, a ball 146 in the stylus tip 104 is able to drive the haptic stylus 100 in two dimensions when is being in contact with any surface of interaction, including the touchscreen 190 of the portable electronic device 184.

FIG. 7B illustrates a preferred embodiment of the stylus housing 102 with a stick-slip motor (third actuator) supporting the haptic stylus displacements across the surface of interaction in two dimensions of X- and Y-axes.

The stylus housing 102 is provided with embedded two linear piezoelectric actuators 160 and 162 which are able to generate translational forces applied in the points 164 through levers 154 and 158, the lever/shaft 152, a spring 156 and a couple of spherical joints to the contact plate/disk 150.

Using the stick-slip phenomenon and the inertia phenomenon, and by generating translational forces applied to the contact plate/disk 150, the haptic stylus 100 can be moved with respect to the surface of interaction in any direction.

Herewith, the contact plate/disk 150 may have a static friction with the contact surface in a stationary phase at least 30% greater than during dynamic phase of sliding. This is possible to realize using the specific covering of the contact plate/disk 150, or/and a contact surface of interaction 207 (FIG. 8A, FIGS. 9A and 9B), using a silicone-based or nanostructured material with a given transparency and parameters of controlled friction (as indicated in reference to FIGS. 6A to 6F, or electro-adhesive effect, electrorheological gel or any other suitable technology or material) or a specific design of the contact plate/disk 150 or a contact surface 207 with embedded dielectric elastomer actuator, similarly as shown in FIG. 6D with respect to the stylus covering.

Figure 8A:
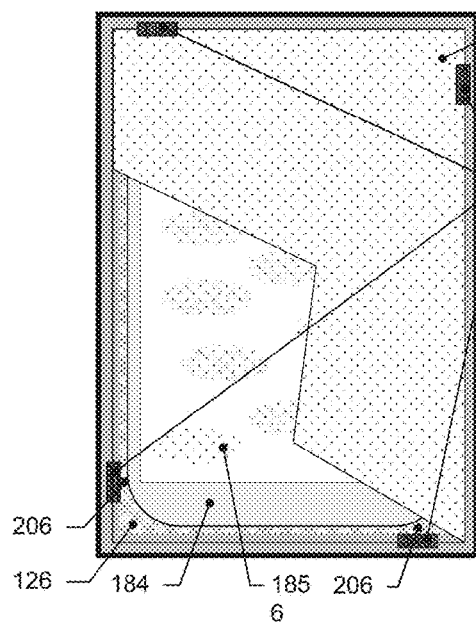
Figure 8B:
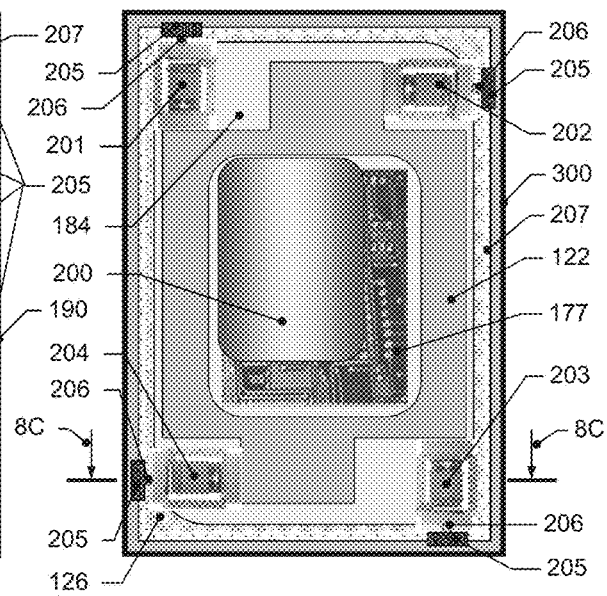
Figure 8C:
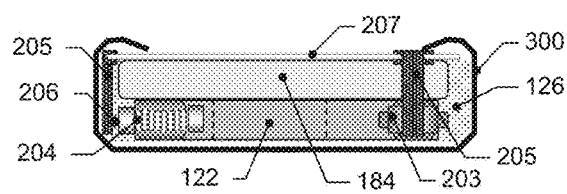

FIG. 8A-8C illustrate arrangement of actuators in a haptic contact surface, which is a motorized contact surface capable of generating forces to move the stylus tip or a contact plate/disk in X-Y directions. FIG. 8A shows a top view, FIG. 8B shows a bottom view, and FIG. 8C shows a cross-sectional view.

Figure 9A:
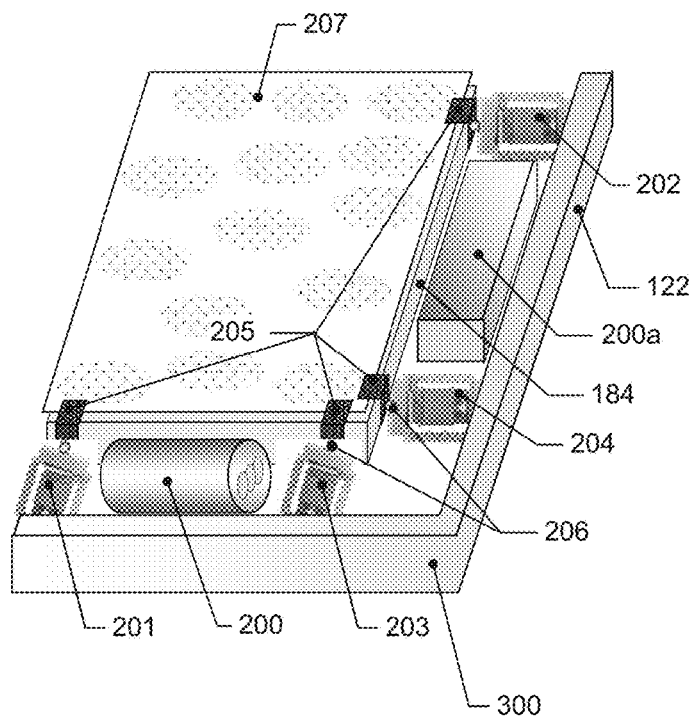
Figure 9B:
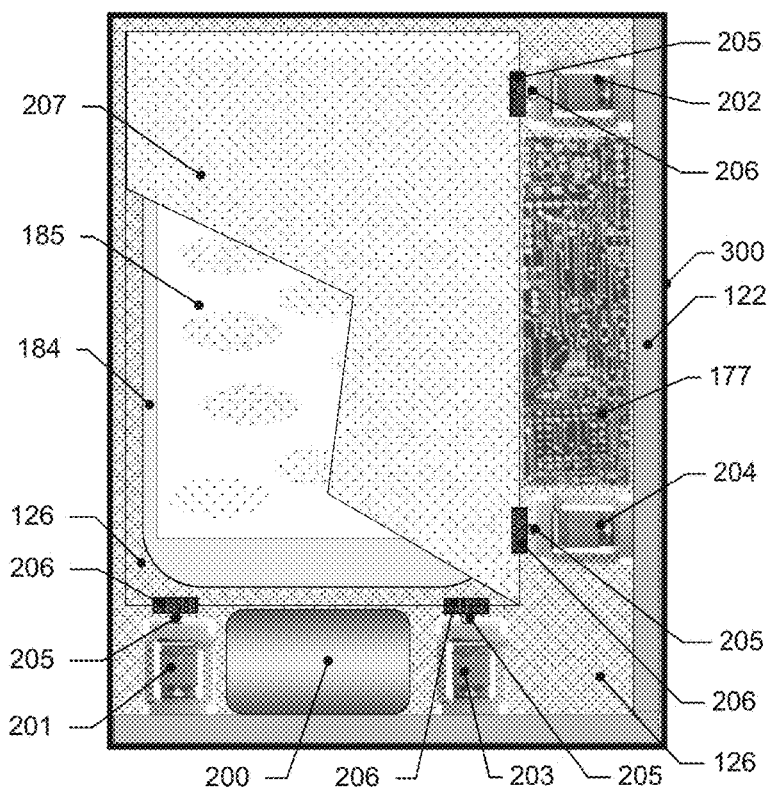

FIGS. 9A and 9B illustrate another example of a haptic contact surface. FIG. 9A shows a perspective view, and FIG. 9B shows a top view.

FIGS. 8A to 9B illustrate a preferred embodiment of the 2D-displacement provider for realizing 2D displacement (displacement in X-Y directions) of the stylus tip 104 with respect to the surface of interaction 185. The 2D-displacement provider is provided in the surface of interaction 185 of the portable electronic device 184, instead of the spherical motor 148 as shown in FIG. 7A or the stick slip motor as shown in FIG. 7B being embedded into the stylus housing 102. In each of FIGS. 8A and 9A, a lower-left quarter part of an overlay 207 is virtually removed for exposing the portable electronic device 184.

According to the embodiment, the 2D-displacement provider is configured by four linear piezoelectric actuators (fourth actuators) 201, 202, 203, 204. Although the linear piezoelectric actuator is exemplified, any type of linear actuator, such as magnetostrictive, electromagnetic, pneumatic, hydraulic and dielectric elastomer actuators or the like, can be used to configure the 2D displacement provider. The linear piezoelectric actuators 201, 202, 203, 204 are allocated in the case 300. In addition, an additional power source 200 and driving electronics 177 for the linear piezoelectric actuators 201, 202, 203, 204 are also allocated in the case 300. This allows using the rechargeable battery 200a as a reserve power source (bank) of the portable electronic device 184 when the main battery gets low.

The four linear piezoelectric actuators 202, 203, 204 are allocated behind the portable electronic device 184. As shown in FIGS. 8A and 8B, the four linear piezoelectric actuators 201, 202, 203, 204 can be arranged respectively at the four corners of the portable electronic device 184. Alternatively, as shown in FIGS. 9A and 9B, the four linear piezoelectric actuators 201, 202, 203, 204 can be arranged along the two neighboring sides of the portable electric device 184. Although it is not shown in the drawings, the four linear piezoelectric actuators 201, 202, 203, 204 can be arranged respectively at the middle portions of the four sides of the portable electronic device 184. Translational forces of the four linear piezoelectric actuators 201, 202, 203, 204 are delivered to the additional stiff overlay 207 through a rigid bar and brackets 205 in the points 206.

The end-mass 122 can be placed in the central position behind the portable electronic device 184 or along two neighboring sides of the case 300. The space surround the components can be filled in by the thermally conductive silicone rubber material 126 as a soundproof material to attenuate unnecessary components of vibration. Although the embodiment exemplifies the case where the same materials 126 are used for both of the haptic stylus 100 and the case 300 are the same, the different materials may be used for the haptic stylus 100 and the case 300 depending on, for example, the respective usage conditions of the haptic stylus 100 and the case 300.

By actuating the four linear piezoelectric actuators 201, 202, 203, 204, a translational vibration is caused on the overlay 207, thereby functioning as the 2D-displacement provider. When the stylus tip 104 of the haptic stylus 100 is in contact with the overlay 207, it is possible to move the stylus tip 104 of the haptic stylus 100 in X-Y directions.

Figure 10A:
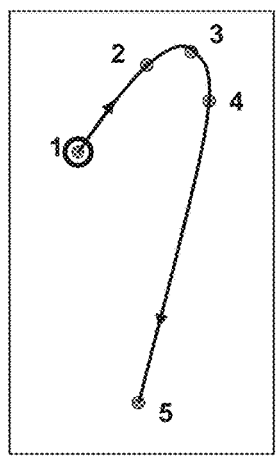
FIGS. 10A to 10F illustrate technical solutions of the haptic stylus according to the embodiment and comparison examples.

FIG. 10A illustrates the general task model that can be efficiently solved using the technique disclosed in the embodiment.

In particular, there is a point 1 which the user has to detect and identify to begin motion along the route/trajectory/path having the specific parameters. Thereafter, the user sequentially has to achieve points 2, 3, 4 and to reach the destination point 5. Herewith, the route/trajectory/path can have or not have a variation of the mechanical/chemical/physical parameters, such as altitude, depth, temperature, moisture, wind, or the like of environment (for example, soil, water, atmosphere in a case of ExoPlanet Adventure).

This task might be related to learning drawing, painting, handwriting and calligraphy the novices who never had the specific skills (previous experience) in the foreign language, e.g., children. The task can be used for a rehabilitation of elderly people who lost their writing skills due to head injury, after a stroke or age-related memory loss. A similar task can be used to train a navigation officer for basic route navigation planning with a given depth, a builder of railways, overpasses/flyovers and pipelines. The task model can also be applied for augmented reality and haptic visualization for navigation in mega mall, hypermarkets and mega-tall office towers. Simulating the virtual navigation in the human brain or other biological organs and tissues is also fit to the task of tracking the route.

Figure 10B:
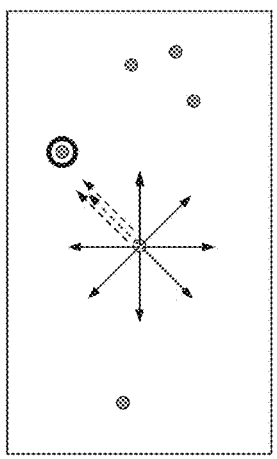
Figure 10C:
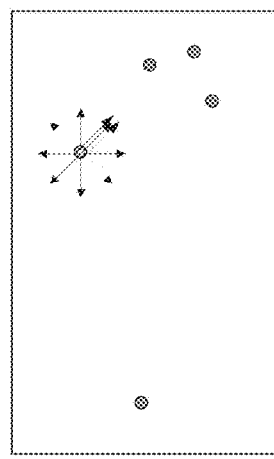
Figure 10D:
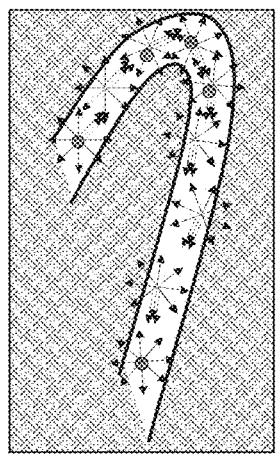
Figure 10E:
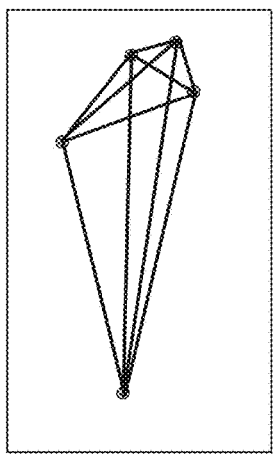
Figure 10F:
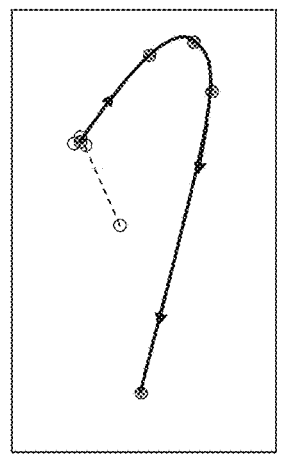

In a general case, the user should detect and identify the starting point that can have a specific visual landmark or can rely exclusively on directional haptic cues, a touch sense of simulated textures and warning signals (using sounds and vibrations) which have to provide the specific guidance to solve the task in the most efficient way. For instance, by making exploratory movements (short strokes (arrows in FIGS. 10A to 10F) in any direction) near the primary contact point the user was able to detect vibration (FIG. 10B, three dashed arrows) that could mean the right way towards the starting point. When the stylus tip achieved the starting point that could be confirmed by the sound or haptic feedback, the user will continue to perform the search to detect the next directional signal etc. (FIGS. 10C and 10D). Different haptic cues (forces, vibrations and/or movements) as well as the texture having a higher friction (FIG. 10D) surrounding the route can be assigned to guide the user "on the fly". However, such an exploration technique that would be appropriate for the gameplay can not be used for learning the specific skills as surgery, handwriting, navigation and engineering. Though some tasks could have multiple solutions (FIG. 10E), in the specific content (such as, a learning content), there may be provided only a single route to be passed in time with a minimum deviation.

Therefore, according the preferred embodiment (FIG. 10F), the stylus may be moved automatically to the starting point 1 (preferably in a one stroke) as the pointer to the default button in a dialog box. Then, immediately after the confirmation signal (vibration is marked as 3 small circles in the point 1), the stylus will follow the route/trajectory/path with an assigned speed by stimulating the kinesthetic memory of the user. Herewith, a location of the fingers holding the stylus can be altered/changed "on the fly" according to other parameters which are provided by the trainee, the skilled user or the personal assistant application (like Cortana or Siri). Thus, learning by continuous supervising technique can speed up the process of skill acquisition, or/and finger-movement tracking performance can be improved in children, novices and elderly people. Blind and visually-impaired people could also take advantage of this technique for independent living.

The embodiments described herein may also be implemented in part or in whole, as hardware logic circuits, which may or may not include a processor.

The invention may be variously embodied, and preferred configurations are exemplified below.

The invention provides a haptic stylus interface device. The haptic stylus interface device may include a haptic stylus, configured to control a position of the fingers gripping and holding the haptic stylus by relying on inertia, friction and kinetic energy induced by unbalanced axial forces. The haptic stylus interface device may also include a covering surface configured to produce different tactile sensations under the fingertips traveling along the haptic stylus. The stylus may have a conductive tip or nib configured to provide capacitive coupling with a touchscreen and to thereby detect pressure when is being in contact with any surface of interaction. There may be further provided embedded sensors and actuators, electronic components needed to support a various functionality of the haptic stylus, a power supply, and a wireless communications module enabling information transfer with an external computer or/and portable electronic device.

The invention may be embodied such that the location of the tip or tip can be detected with respect to the surface of interaction using any known detection techniques, and capacitive, inductive, ultrasonic, electromagnetic, video-based or another suitable contact or remote/proximity sensors.

The invention may be embodied such that a detector configured to detect a contact pressure of the haptic stylus to the surface of interaction can be located inside the haptic stylus on the circuit board closer to the stylus tip, or can be located outside the haptic stylus, near/under the surface of interaction (e.g., within the external portable electronic device).

The invention may be embodied such that a position of the fingers gripping and holding the haptic stylus can be changed using the stick-slip phenomenon by relying on inertia, friction and kinetic energy induced by unbalanced axial forces that can be produced by embedded actuator.

The invention may be embodied such that the embedded actuator may be able to exert different axial force (asymmetric friction forces) and acceleration in two opposite directions and can be of any suitable type and nature, such as piezoelectric, magnetostrictive, electromagnetic (voice-coil), pneumatic, hydraulic, dielectric elastomer actuators or a like.

The invention may be embodied such that the embedded actuator is located near the stylus cap on the side opposite to the stylus tip and has a stiff linkage with the cap while the opposite side of the actuator is affixed to end-mass.

The invention may be embodied such that the end-mass together with a stylus housing and all embedded components presents an inertial mass regarding which the embedded actuator may be able to exert different axial forces applied to directly to the base of the stylus covering or to the stylus cap linked with the base of the stylus covering, or any other way to transfer longitudinal movements of the embedded actuator to the base of the stylus covering, while the end-mass adjusts inertial mass to the resonance frequency of movable system of the base of the stylus covering and the cap.

The invention may be embodied such that the cap is affixed to the base of the stylus covering with a threaded joint, screws or another way/mechanism which cannot be affected by vibration.

The invention may be embodied such that the embedded actuator is separated from other embedded components with a stop washer that is tightly affixed to the stylus housing with a threaded joint, screws or other way which cannot be affected by vibration.

The invention may be embodied such that the end-mass is separated from the stylus housing and the stop washer with the use of thermally conductive silicone rubber material to attenuate unnecessary components of vibration and to dissipate heating of the embedded actuator.

The invention may be embodied such that the base of the stylus covering presents a tube that is able to slide over the stylus housing at a distance limited to the displacements the embedded actuator is able to achieve.

The invention may be embodied such that the base of the stylus covering can be separated from the stylus housing with the use of inserts or bearings providing a minimal friction and area of the contact with the base or other way.

The invention may be embodied such that the base tube of the stylus covering has a pattern of engraved texture on the external surface which is in a continuous contact with the user fingertips and is able to produce different tactile sensations depending on the variation of the grip force (normal force exerted upon the tube by the user, and speed of the fingers/thumb displacement along the longitudinal axis of the stylus).

The invention may be embodied such that a pattern of engraved texture(s) has a specific gradient of the textured elements, while the texture gradient can be presented continuously or being segmented into a number of zones which are well-distinguishable by touch.

The invention may be embodied such that the base tube of the stylus covering can be covered with a composite light-sensitive or thermoresponsive nanostructured material (e.g., azobenzene or a like azo compound) that is able to change friction by temperature/heating or demonstrating light-induced polymerization or photoisomerization when altering trans-form into cis-form. Similar smart material sensitive to temperature/heating, a specific optical spectrum, electrical or magnetic field can be used as well. Herewith, the composite material could have in its structure embedded optical (magnetic or electro-conductive) fibers having proper parameters to induce the isomerization process. Such an embodiment allows to dynamically alter the friction when the user's fingertips travel along the haptic stylus.

The invention may be embodied such that the stylus covering is touch-sensitive and can be used as interactive surface, that is, through the stylus covering embedded microcontroller is able to detect and identify different user input behaviors as commands, when the user press/squeeze or click/tap on the covering with a different force, and to initialize/configure or customize an application, to select the needed/specific mode or to respond to some event, or for the user identification (based on pressure redistribution and information collected from other sensors when analyzing the password entered by handwriting).

The invention may be embodied such that the touch-sensitive stylus covering when interacting with an external portable electronic device the touch-sensitive stylus covering can realize a more advanced functionality of the multi-dimensional volumetric touch input. That is, functionality of the stylus covering can be dynamically altered depends on the position of the stylus on a touchscreen and a spatial position of the portable electronic device, the application context and other parameters.

The invention may be embodied such that the stylus covering is being segmented along the longitudinal axis and each segment has different texture pattern or and the gradient of the texture pattern.

The invention may be embodied such that both the stylus housing and the base of the stylus covering can have any other non-circular shape with a flat or slightly concave surface of edges that can better fit to the hand from the ergonomic point of view.

The invention may be embodied such that the stylus covering includes several layers: the base, the sensors, the actuators and an external shell.

The invention may be embodied such that the stylus covering has embedded sensors or/and actuators (of any physical nature) which are distributed according to the segments.

The invention may be embodied such that the stylus covering has embedded actuators/sensors which are able to detect/measure pressure, as self-sensing actuators.

The invention may be embodied such that the external shell of the stylus covering has the holes through which the pins of elastic material having a higher friction than a shell of the covering can be pushed out to mechanically change the friction between the stylus covering and the user's fingertips.

The invention may be embodied such that the holes are arranged along edges of the segmented external shell of the stylus covering. Alternatively, the pins of elastic material can be pushed out through the holes arranged along the longitudinal axis of the stylus with a specific gradient of density of the holes.

The invention may be embodied such that the external shell of the stylus covering or/and the layer of self-sensing actuators are segmented on the parallel slices that are being rectangular to the longitudinal axis of the stylus.

The invention may be embodied such that the segmented parallel slices of the external shell of the stylus covering or/and the layer of self-sensing actuators can be arranged in a specific pattern of layout across the longitudinal axis of the stylus covering.

The invention may be embodied such that the external shell of the covering within each slice can be additionally segmented to allow extending individual pins of elastic material through the holes within each slice sequentially, by simulating the specific tactile feelings that swirl around the stylus clockwise or counter clockwise.

The invention may be embodied such that the forces driving the haptic stylus to move across the surface of interaction can be generated using the actuators embedded into the haptic stylus or the actuators affixed to the overlay of the touchscreen or any other surface of interaction.

The invention may be embodied such that the stylus tip is configured as the motorized stylus tip that can produce forces, which are being applied to the stylus tip, and are able to move the haptic stylus regarding the contact surface in X-Y directions with respect to the user hand gripping and holding the haptic stylus.

The invention may be embodied such that the motorized stylus tip presents the embedded miniature spherical motor supporting the haptic stylus displacements across the surface of interaction in two dimensions (X-Y) when is being in contact with any surface of interaction, including the touchscreen of the portable electronic device. Herewith the embedded miniature spherical motor can be of any suitable type and nature, such as piezoelectric, magnetostrictive, electromagnetic, or a like.

The invention may be embodied such that the location of the motorized stylus tip or the embedded miniature spherical motor can be detected with respect to the surface of interaction using any known detection techniques, and capacitive, inductive, ultrasonic, electromagnetic, video-based or another suitable contact or remote/proximity sensors.

The invention may be embodied such that the embedded miniature spherical motor is separated from other embedded components with a stop washer that is tightly affixed to the stylus housing with a threaded joint, screws or other ways which cannot be affected by vibration. Herewith, the embedded miniature spherical motor is affixed to an additional end-mass, while the end-mass is separated from the stylus housing and stop washer with the use of thermally conductive silicone rubber material to attenuate unnecessary components of vibration and to dissipate heat of the mechanical parts of the spherical motor.

The invention may be embodied such that the stylus tip is configured as the embedded miniature stick-slip motor supporting the haptic stylus displacements across the surface of interaction in two dimensions (X-Y) when is being in contact with the surface of interaction having a specific parameters of friction such as glass, plexiglass, Gorilla glass or a like, including the touchscreen of the portable electronic device. Herewith, the embedded miniature stick-slip motor is affixed to an additional end-mass, while the end-mass is separated from the stylus housing and stop washer with the use of thermally conductive silicone rubber material to attenuate unnecessary components of vibration and to dissipate heat of the mechanical parts of the spherical motor.

The invention may be embodied such that the embedded miniature stick-slip motor is in contact with the surface of interaction through the contact plate/disk mediating translational forces applied through a system of levers from linear actuators to the plate/disk. Herewith, the contact plate/disk may have static friction with the contact surface in a stationary phase at least 30% greater than during dynamic phase of sliding.

The invention may be embodied such that the contact plate/disk is affixed to the lever/shaft with a spherical joint to enable the plate/disk to maintain contact with a surface as the lever/shaft is moved through different orientations of the haptic stylus.

The invention may be embodied such that the contact plate/disk has a covering of silicone-based or composite nanostructured light-sensitive or thermoresponsive material (as azobenzene or a like), electrorheological gel or any other material with given parameters of friction that can be controlled relying on polymerization, photo-isomerization, electromagnetic field or electro-adhesive effect (or another suitable technology). Herewith, the composite material could have in its structure embedded optical, magnetic or electro-conductive fibers (or another components) having proper parameters to induce polymerization, isomerization or another process/phenomenon and to alter friction force between the contact plate/disk covering and the surface of interaction.

The invention may be embodied such that the contact plate/disk includes several layers: the base, the actuator (e.g., embedded dielectric elastomer actuator) and an external shell. Herewith, the shell (external covering) having a low friction coefficient and the holes through which the small pins of elastic material having a higher friction than a shell of the contact plate/disk can be pushed out to mechanically change the friction between the contact plate/disk and interactive surface synchronously with different phases of translational forces produced by the stick-slip motor, or/and in accordance with different scenarios of using the haptic stylus, and anticipated behavior of the user.

The invention may be embodied such that the contact plate/disk includes several layers: the base, the actuator (e.g., piezoelectric/ultrasonic actuator) and an external shell. Herewith, the shell (external covering) has a high friction regarding the interactive surface that can be reduced by inducing high-frequency (ultrasonic) repetitive tangential movements of the covering (e.g., U.S. Pat. No. 6,724,128-B) synchronously with different phases of translational forces produced by the stick-slip motor, or/and in accordance with different scenarios of using the haptic stylus, and anticipated behavior of the user.

The invention may be embodied such that the haptic stylus displacements across the surface of interaction in two dimensions (X-Y) are provided by an external planar manipulator affixed to the surface of interaction or to the touchscreen of the portable electronic device.

The invention may be embodied such that the stylus tip can have or not have a specific shape or/and the contact plate/disk with a given or/and controlled friction parameters synchronously with different phases of translational forces produced by the external planar manipulator.

The invention may be embodied such that there is provided a printed circuit board, a rechargeable battery, an internal power supply, a multi-state indicator, at least two processor-based microcontrollers, a memory, at least one actuator of the fingers' grip, a driving control mechanism, sensors, haptic actuator and an information exchange transceiver.

The invention may be embodied such that the rechargeable battery is a nickel-cadmium cell, a NiMH battery, a lithium cell or a like.

The invention may be embodied such that an internal power supply configured to convert DC power stored in a rechargeable battery into various DC voltages needed to run all the components serving functionalities of the haptic stylus. A power supply also maintains charging the embedded battery.

The invention may be embodied such that a multi-state visual indicator indicates the battery status and charging mode, activating the stylus, a selection of the specific task when it was made by the user or was detected automatically, and displays the warning signals regarding the mode, failure or/and application running on a portable electronic device.

The invention may be embodied such that the first processor-based microcontroller incorporating a MEMS sensor hub is configured to perform preprocessing of information gathered by other sensors such as a 3D digital accelerometer and a 3D digital gyroscope detecting a spatial position of the stylus housing regarding the surface of interaction, MEMS microphone and vibration sensor, pressure sensor of the stylus tip, multipoint detector of the fingers' pressure, and multipoint detector of the user fingers' grip.

The invention may be embodied such that the second processor-based microcontroller is configured to perform the user identification, to initialize/configure or customize an application, to select the needed/specific mode and the user-specific behavioral model; to analyze basic patterns (templates) of the user behavior (with respect to the haptic stylus surface interaction as well as noncontact stylus manipulation) regarding the general task models, modes and scenarios for which the haptic stylus is appropriate/intended for the use; to control the fingers' grip position with respect to the haptic stylus using the embedded actuator located near the stylus cap and linked with the base tube of the stylus covering; to control a stylus location and displacements regarding the surface of interaction when the haptic stylus is equipped with the embedded miniature spherical motor supporting the haptic stylus displacements; to provide a wireless communication between the haptic stylus and an external (portable) electronic device; to manage/alter the complementary tactile signals generated by the tactile texture modulator and haptic actuator; and to display necessary visual signals on the multi-state indicator.

The invention may be embodied such that a memory is used for storing any type of data (e.g., parameters of specific trajectories of symbols, letters, hieroglyphs, basic geometric shapes, and other linguistic and grammatical features, patterns of simulated textures, vibration signals, and tactile effects) to operate by driving control mechanisms in accordance with different scenarios of using the haptic stylus, and anticipated behavior of the user and to support different functionalities of the device. Herewith the memory is a non-volatile memory. The more complex data can be transferred to/from or/and stored in the memory of the external (portable) electronic device. The portable device may be used to backup/store raw and processed data collected by the haptic stylus to develop/model long-term user behavior, within various scenarios for security, efficiency and replication purposes.

The invention may be embodied such that an information exchange transceiver configured to exchange or/and synchronize information with the portable electronic device and another device (that can be a similar haptic stylus). Herewith the information includes a coordinate of the point of contact by the haptic stylus on the touchscreen or/and any related parameters that have to be changed/altered "on the fly" during the application run time.

The invention may be embodied such that a driving control mechanism provides the embedded actuator with a specific sawtooth waveform of the output signals having a given magnitude and frequency.

The invention may be embodied such that a driving control mechanism of (embedded or external) actuators driving the haptic stylus to move across the surface of interaction are able to drive or/and correct the position of the stylus tip against the user input movements when necessary. This driving control mechanism may utilize collected data from the haptic stylus or/and the external device memory to replicate or remodel user/stylus movements within various scenarios or guide one user to reproduce stylus movements performed by other users/experts for learning or guidance purposes.

The invention may be embodied such that a driving control mechanism of embedded haptic actuator and a driving control mechanism of tactile texture generator/modulator provides each specific actuator with the output signals having a given magnitude, frequency and duration.

The invention claimed is:

1. A haptic stylus, comprising:
a stylus tip to be in contact with an interaction surface, including a touchscreen; and
a stylus covering to be gripped/held by user's fingers,
wherein the stylus covering is configured to oscillate such that the user's fingers gripping/holding the stylus covering moves along a longitudinal direction of the haptic stylus due to inertia, friction and kinetic energy induced by unbalanced axial forces.

2. The haptic stylus of claim 1,
wherein the stylus covering can provide different tactile sensations to the user's fingers moving therealong.

3. The haptic stylus of claim 2,
wherein a tubular base of the stylus covering has a pattern of engraved texture on the external surface which is in a continuous contact with the user's fingers and is able to produce different tactile sensations depending on
a variation of a grip force,
a normal force exerted upon the tubular base by the user, and
a speed of displacement of the user's fingers along the longitudinal direction of the haptic stylus.

4. The haptic stylus of claim 3,
wherein the pattern of engraved texture is presented continuously or segmented into a number of zones to have a density gradient.

5. The haptic stylus of claim 2,
wherein the stylus covering is being segmented along the longitudinal direction, and each segment has different texture pattern or a density gradient in the texture pattern.

6. The haptic stylus of claim 1,
wherein the stylus covering includes:
a tubular base;
an external shell provided concentrically with the tubular base; and
a part/material provided between the tubular base and the external shell, and configured to function not only as a sensor/detector to detect a user's griping pressure applied to the eternal shell but also as an actuator to generate a force toward the external shell.

7. The haptic stylus of claim 6,
wherein the tubular base, the external shell and the part/material are segmented along a circumferential direction of the stylus covering.

8. The haptic stylus of claim 6,
wherein the tubular base, the external shell and the part/material are segmented into parallel slices perpendicularly to the longitudinal direction of the stylus covering.

9. The haptic stylus of claim 1,
wherein the stylus covering includes:
a tubular base;
an external shell provided concentrically with the tubular base;
a second actuator provided between the tubular base and the external shell, and configured to generate a force toward the external shell.

10. The haptic stylus of claim 9,
wherein the second actuator is a polymer actuator.

11. The haptic stylus of claim 9,
wherein pins having a higher friction than the external shell protrude from holes formed in the external shell, to thereby change a friction between the stylus covering and the user's fingers.

12. The haptic stylus of claim 11,
wherein the holes have a density gradient along the longitudinal direction of the stylus covering.

13. The haptic stylus of claim 9,
wherein the tubular base, the external shell and the second actuator are segmented along a circumferential direction of the stylus covering.

14. The haptic stylus of claim 9,
wherein the tubular base, the external shell and the second actuator are segmented into parallel slices perpendicularly to the longitudinal direction of the stylus covering.

15. The haptic stylus of claim 9,
wherein the haptic stylus is configured to interact with an electronic device, and
wherein a controller, which is configured to control the second actuator, is provided in the haptic stylus or the electronic device.

16. The haptic stylus of claim 9,
wherein the stylus tip is moved with respect to the interaction surface by a fourth actuator, which is provided in an external device having the interaction surface.

17. The haptic stylus of claim 16,
wherein the haptic stylus is configured to interact with an electronic device, and
wherein a controller, which is configured to control the first actuator, the second actuator and the fourth actuator, is provided in the haptic stylus or the electronic device.

18. The haptic stylus of claim 1, further comprising:
a third actuator configured to move the stylus tip with respect to the interaction surface.

19. The haptic stylus of claim 18,
wherein the third actuator is a spherical motor or a stick slip motor.

20. The haptic stylus of claim 18, further comprising:
a location detector configured to detect a location of the stylus tip or the third actuator with respect to the interaction surface.

21. The haptic stylus of claim 18,
wherein the haptic stylus is configured to interact with an electronic device, and
wherein a controller, which is configured to control the third actuator, is provided in the haptic stylus or the electronic device.

22. The haptic stylus of claim 1,
wherein the stylus tip is moved with respect to the interaction surface by a fourth actuator provided in an external device which includes the interaction surface.

23. The haptic stylus of claim 22,
wherein the haptic stylus is configured to interact with an electronic device, and
wherein a controller, which is configured to control the fourth actuator, is provided in the haptic stylus or the electronic device.

24. A haptic stylus, comprising:
a stylus housing;
a stylus tip attached to one end of the stylus housing, so as to be in contact with an interaction surface, including a touchscreen;
a stylus covering attached to a circumference of the stylus housing, so as to be movable with respect to the stylus housing along a longitudinal direction of the haptic stylus and so as to be gripped/held by user's fingers; and a first actuator configured to activate the stylus housing to thereby cause a stick-slip phenomenon between the stylus covering and the user's fingers gripping/holding the stylus covering, thereby allowing the user's fingers to grip/hold the stylus covering while moving along the longitudinal direction of the haptic stylus.

25. The haptic stylus of claim 24,
wherein the stylus covering includes:
   a tubular base; and
   a friction suppressor, including a bearing, mounting the tubular base on the stylus housing.

26. The haptic stylus of claim 25,
wherein the first actuator is attached to the opposite end of the stylus housing to the stylus tip,
wherein a cap is attached to one end of the tubular base, and
wherein a force generated by the first actuator is transmitted to the tubular base via the cap, and thereafter, to the stylus covering.

27. The haptic stylus of claim 24,
wherein the stylus is configured to perform movements in two directions of X- and Y-axes, which are orthogonal with each other, across the surface of touchscreen by generating coercive forces on the stylus tip to travel across the surface of the touchscreen, using the stick-slip phenomenon and inertia.

28. The haptic stylus of claim 27,
wherein the stylus is configured to move with respect to the user's fingers which are gripping and holding the stylus covering along a longitudinal Z-axis, realized by generating tangential forces on the stylus covering using the stick-slip phenomenon and inertia.

29. The haptic stylus of claim 28,
wherein the movements in the two directions of X- and Y-axes are generated by providing actuators to at least one of the stylus tip and the touchscreen, and the movement in direction of Z-axis is realized only by providing the first actuator to the stylus covering.

* * * * *